United States Patent [19]

Day et al.

[11] Patent Number: 5,435,529
[45] Date of Patent: Jul. 25, 1995

[54] CABLE CONTROL ACTUATOR FOR A LOCKING GAS SPRING

[75] Inventors: Kerry A. Day, Parsippany; Thomas J. Voytac, Montville; Robert A. Clegg, Oakridge, all of N.J.

[73] Assignee: Cable Manufacturing & Assembly Co., Inc., Rockaway, N.J.

[21] Appl. No.: 159,426

[22] Filed: Nov. 30, 1993

[51] Int. Cl.[6] ............................ F16F 9/36; F16F 9/32
[52] U.S. Cl. ................................. 267/64.12; 188/300
[58] Field of Search ............... 267/64.12, 64.22, 64.18, 267/64.26, 64.28, 131; 188/300, 310, 322.13, 322.21, 299; 248/161; 297/344.19, 500.5; 74/501.6

[56] References Cited

U.S. PATENT DOCUMENTS

| | | | |
|---|---|---|---|
| 3,063,518 | 11/1962 | Stark | 188/300 |
| 3,471,140 | 10/1969 | Ballard | 188/300 |
| 4,515,034 | 5/1985 | Porter | 188/300 |
| 4,834,347 | 5/1989 | Pauliukonis | 188/300 |
| 4,944,705 | 7/1990 | Kashima et al. | 188/300 |
| 4,989,698 | 2/1991 | Dony | 188/300 |

FOREIGN PATENT DOCUMENTS 5106674 4/1993 Japan ................................. 188/300

*Primary Examiner*—Robert J. Oberleitner
*Assistant Examiner*—Chris Schwartz
*Attorney, Agent, or Firm*—Harness, Dickey & Pierce

[57] ABSTRACT

An operator for a locking gas spring has a rotating cam which causes an actuating pin to move longitudinally within the actuator to operate the gas spring. The rotating cam is rotated by using a flexible cable to allow the positioning of an actuating mechanism in a user friendly location.

20 Claims, 2 Drawing Sheets

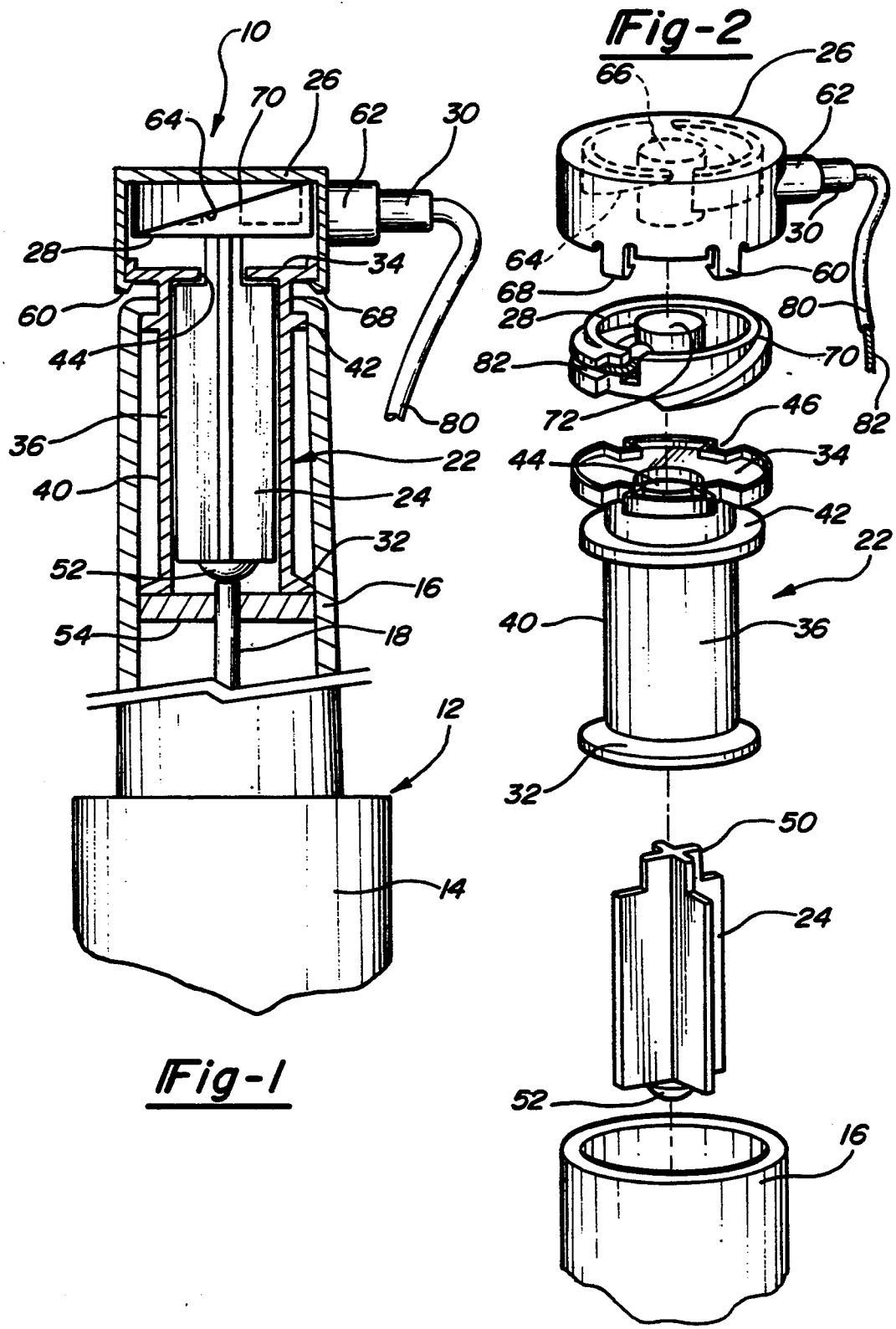

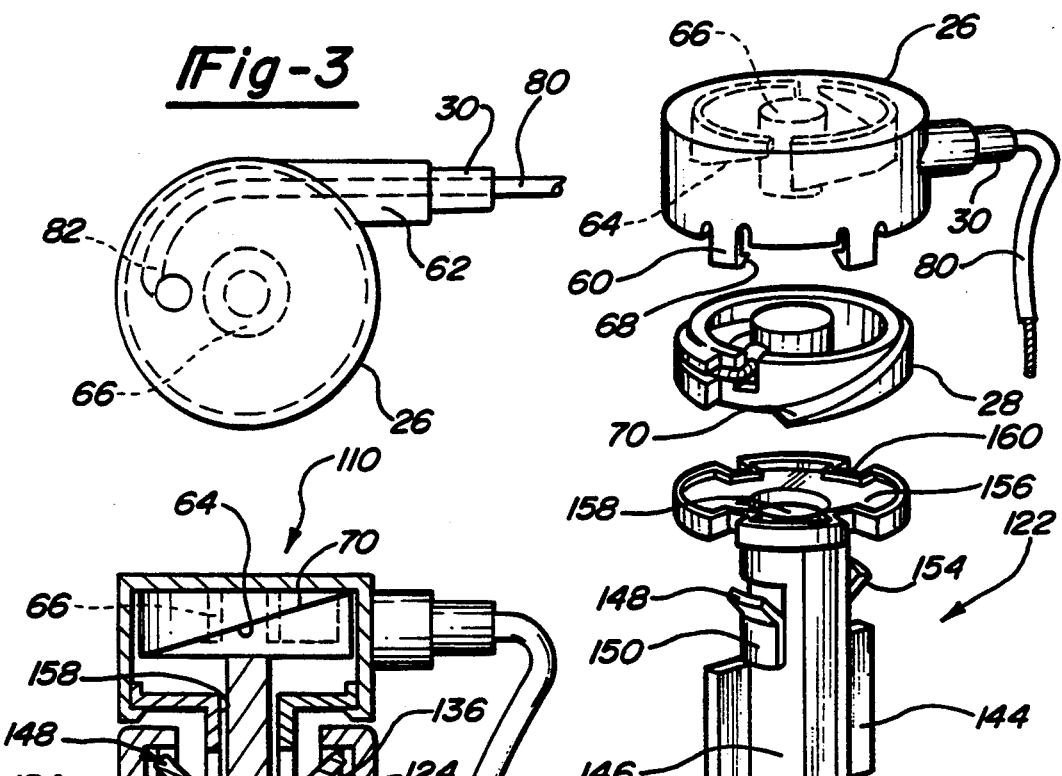
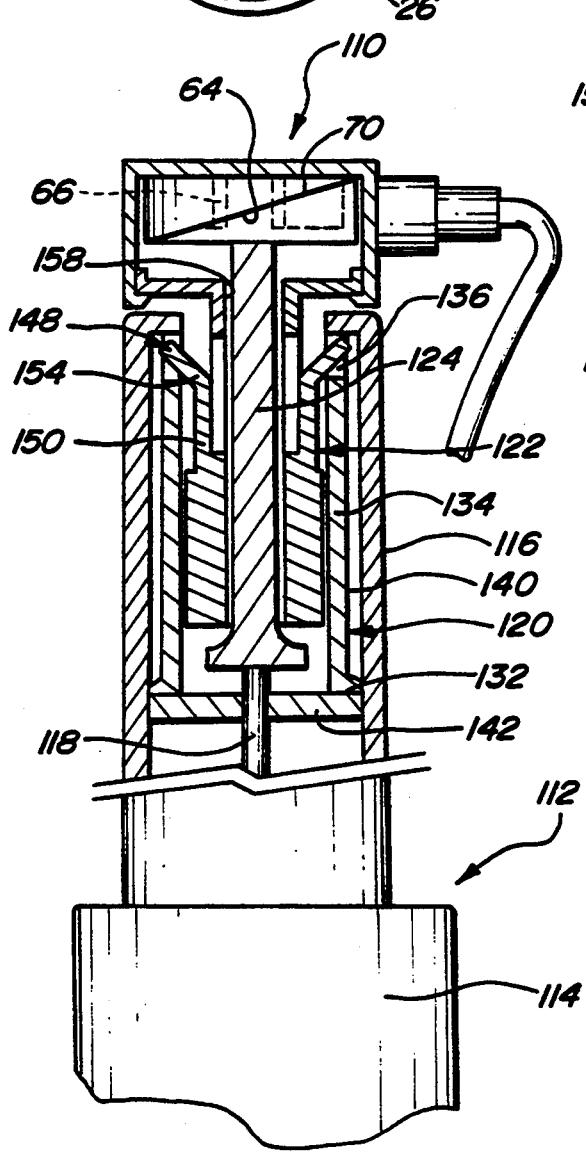
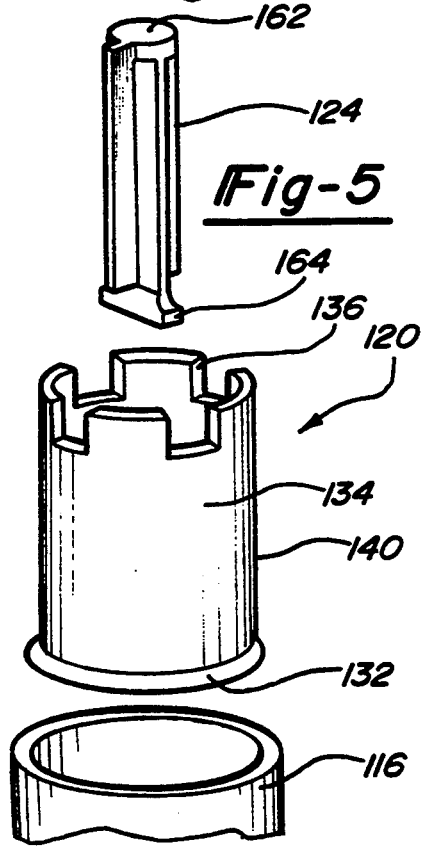

CABLE CONTROL ACTUATOR FOR A LOCKING GAS SPRING

FIELD OF THE INVENTION

The present invention relates to the control mechanism for a locking gas spring. More particularly, the present invention relates to a cable control operator which actuates a valve pin on a locking gas spring.

BACKGROUND AND SUMMARY OF THE INVENTION

The furniture industry utilizes lockable gas springs for the manufacture of numerous furniture pieces including desk chairs, arm chairs, beds and stands. The lockable gas spring makes it possible to infinitely adjust the piece of furniture to suit each individual's personal requirement. The lockable gas spring is usually mounted between a fixed point and a movable point which allows for the adjustment of the furniture to a desired position and the associated locking of the gas spring to maintain this desired position.

A variety of mechanisms have been developed to operate the lockable gas valve in order to allow for the adjustment of the piece of furniture. The prior art mechanisms include rods, levers, linkages and handles which extend from the lockable gas spring to an area on the piece of furniture which is convenient for the individual who wishes to make an adjustment in the height, position, counter balance or other adjustment of the device. The disadvantage to these prior art systems of rods, levers, linkages and handles is the space they require and the complexity of the system as the control device is routed through the piece of furniture to reach its position of convenience for the individual user.

Accordingly, what is needed is a compact mechanism that will assemble directly to a locking gas spring and which will provide mechanical advantage, space savings, lighter weight while at the same time permitting flexible and remote location to allow for easier user function.

The present invention provides the art with a rotary operating mechanism which is assembled directly to a locking gas spring. The rotary mechanism will transfer rotary motion to a longitudinal motion to actuate the internal valve stem of the locking gas spring permitting the adjustment to the length of the locking gas spring. The rotary mechanism is actuated by a flexible cable control assembly which permits the remote placement of any one type of the various standard or custom cable control actuators in a user friendly location.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a partial cross sectional view of a cable control actuator assembled to a locking gas spring according to a first embodiment of the present invention;

FIG. 2 is an exploded perspective view of the cable control actuator shown in FIG. 1;

FIG. 3 is an end view of the cable control actuator shown in FIG. 1;

FIG. 4 is a partial cross sectional view of a cable control actuator assembled to a locking gas spring according to another embodiment of the present invention; and FIG. 5 is an exploded perspective view of the cable control actuator shown in FIG. 4.

DESCRIPTION OF THE PREFERRED EMBODIMENTS

Referring now to the drawings in which like reference numerals designate like or corresponding parts throughout the several views, there is shown in FIGS. 1 through 3 a cable control operator in accordance with the present invention which is designated generally by the reference numeral 10. Operator 10 is assembled to a locking gas spring 12 which includes a lower housing 14, an upper housing 16 and an internal valve stem 18. Gas spring 12 is normally locked at a specified length due to the gas located within gas spring 12 being trapped on either side of an internal piston (not shown). When valve stem 18 is depressed, an internal valve (not shown) is opened which allows the transfer of gas between the opposite sides of the internal piston thus allowing gas spring 12 to change in length. The gas pressure within gas spring 12 will normally bias gas spring 12 into a fully extended position.

Operator 10 comprises a pin retainer 22, an actuating pin 24, a cam housing 26, a rotating cam 28 and a cable control assembly 30. Pin retainer 22 is a generally cylindrical member having a locating base 32 located on one end, an annular plate 34 located at the opposite end and a hollow main cylindrical body 36 extending between locating base 32 and annular plate 34. Locating base 32 is a triangular shaped annular projection extending radially outward from the outer surface 40 of main cylindrical body 36. Locating base 32 has an external diameter which is sized slightly smaller than the internal diameter of upper housing 16 of gas spring 12. An annular retaining rib 42 located between locating base 32 and annular plate 34 also extends radially outward from outer surface 40. Retaining rib 42 is utilized to retain pin retainer 22 and actuating pin 24 within upper housing 16 of gas spring 12 as will be described later herein.

Annular plate 34 is located on the end of main cylindrical body 36 opposite to locating base 32. A centrally located aperture 44 extends through annular plate 34 to allow for actuating pin 24 to extend through pin retainer 22. Annular plate 34 also has a plurality of circumferentially spaced notches 46 located on its exterior surface and extending radially inward which facilitate the assembly of rotating cam 26 and cam housing 28 to pin retainer 22 as will be described later herein.

Actuating pin 24 is a ribbed pin which has a reduced diameter section 50 located at one end and a partial spherical ball 52 located at its opposite end. Actuating pin 24 is located within pin retainer 22 with reduced diameter section 50 extending through aperture 44. The combination of pin retainer 22 and actuating pin 24 is then placed within upper housing 16 of gas spring 12 such that spherical ball 52 is resting on valve stem 18 and locating base 32 is resting on a partition 54 extending across upper housing 16. The open end of upper housing 16 is then rolled over retaining rib 42 to secure the assembly of pin retainer 22 and actuating pin 24 within upper housing 16 as shown in FIG. 1. The length of actuating pin 24 and pin retainer 22 are designed such that in their assembled condition with upper housing 16, valve stem 18 is in the upward position, with the interior vane of gas spring 12 closed.

Cam housing 26 is a cup shaped housing having a plurality of circumferentially spaced locking tabs 60 which correspond with the plurality of circumferentially spaced notches 46 located on the exterior surface of annular plate 34 of pin retainer 22. A mounting jacket 62 extends from cam housing 26 to provide for the attachment of cable control assembly 30 as well as access for cable control assembly 30 to mate with rotating cam 28. The internal surface of cam housing 26 is provided with a pair of angular camming surfaces 64 and a cylindrical guide member 66 for mating with rotating cam 28 as will be described later herein. Cam housing 26 is assembled to pin retainer 22 by aligning the plurality of circumferentially spaced locking tabs 60 with the plurality of circumferentially spaced notches 46 and extending the plurality of locking tabs 60 through the plurality of notches 46 until a locking flange 68 located on each of the plurality of locking tabs 60 snaps into a position below annular plate 34 as shown in FIG. 1. The plurality of locking tabs 60 are designed to deflect outwardly as cam housing 26 is assembled to annular plate 34. The plurality of locking tabs 60 snap back into their original position once the plurality of locking flanges 68 clear the width of annular plate 34. In this position, cam housing 26 is locked to pin retainer 22. By providing a plurality of circumferentially spaced tabs 60 and corresponding notches 46, it makes it possible to locate mounting jacket 62 at various locations circumferentially with respect to pin retainer 22. Thus jacket 62 may be positioned in the most convenient circumferential location for each individual application.

Disposed between cam housing 26 and actuating pin 24 is rotating cam 28. Rotating cam 28 has a pair of annular camming surfaces 70 which are adapted to mate with the pair of annular camming surfaces 64 of cam housing 26. In its normal position as shown in FIG. 1, camming surfaces 70 are mated with camming surfaces 64 and rotating cam 28 is in contact with both actuating pin 24 and cam housing 26. In this position, actuating pin 24 is resting against rotating cam 28 and valve stem 18 with valve stem 18 in the upward position with the interior valve of gas spring 12 closed. When rotating cam 28 is rotated relative to cam housing 26, rotating cam 28 is forced downward within cam housing 26 due to the interaction of camming surfaces 70 rotating with respect to camming surfaces 64. This downward movement of rotating cam 28 forces actuating pin 24 downward which in turn forces valve stem 18 downward to open the internal valve of gas spring 12 and allow for the adjustment of the length of gas spring 12. Once the desired position of gas spring 12 is achieved, rotating cam 28 is rotated back to its original position after the release of the actuator connected to cable control assembly 30, as shown in FIG. 1, to release valve stem 18 and lock gas spring 12 in its position by closing the internal valve. The movement of rotating cam 28 within cam housing 26 is guided by a cylindrical projection 72 which is slidingly received within cylindrical guide member 66 provided on cam housing 26.

The rotating of rotating cam 28 is accomplished by cable control assembly 30. Cable control assembly 30 comprises an outer conduit 80 and an internal cable 82 which is longitudinally movable within outer conduit 80. Both outer conduit 80 and internal cable 82 are flexible to allow for the routing of cable control assembly 30 to any specified location on the piece of furniture.

As shown in FIGS. 1 through 3, outer conduit 80 is fixedly secured to mounting jacket 62 by means known well in the art. Internal cable 82 extends through outer conduit 80 and through mounting jacket 62 of cam housing 26 and partially wraps around rotating cam 28. The end of internal cable 82 is fixedly secured to rotating cam 28 by methods known well in the art. The opposite end of control cable assembly is attached to any type of the various standard or custom cable control actuators also known well in the art.

When internal cable 82 is pulled longitudinally through outer conduit 80, rotating cam 28 is rotated relative to cam housing 26 and valve stem 18 opens the internal valve as described above. When the control actuator is released, rotating cam 28 is returned to its original position due to a biasing force being applied to valve stem 18 and/or a biasing load being applied to the control actuator.

FIGS. 4 and 5 show a cable control actuator according to another embodiment of the present invention which is designated generally by the reference numeral 110. Actuator 110 shown in FIGS. 4 and 5 is similar to actuator 10 shown in FIGS. 1 through 3 with the main difference being in the retention system used to secure actuator 110 to gas spring 112. Actuator 110 is assembled to locking gas spring 112 which includes a lower housing 114, an upper housing 116 and an internal valve stem 118. Gas spring 112 is normally locked at a specified length due to the gas located within gas spring 112 being trapped on either side of an internal piston (not shown). When valve stem 118 is depressed, an internal valve (not shown) is opened which allows the transfer of gas between the opposite sides of the internal piston thus allowing gas spring 112 to change in length. The gas pressure within gas spring 112 will normally bias gas spring 112 into a fully extended position.

Actuator 110 comprises a die cast sleeve 120, a pin retainer 122, an actuating pin 124, a cam housing 26, a rotating cam 28 and a cable control assembly 30. Die cast sleeve 120 is a generally cylindrical member having a locating base 132 located on one end of a hollow main cylindrical body 134. The opposite end of cylindrical body 134 has a plurality of axially extending circumferentially spaced notches 136 extending through cylindrical body 134. Locating base 132 is a triangular shaped annular projection extending radially outward from the outer surface 140 of main cylindrical body 134. Locating base 132 has an external diameter which is slightly smaller than the internal diameter of upper housing 116 of gas spring 112. Die cast sleeve 120 is located within upper housing 116 of gas spring 112 such that locating base 132 is resting on a partition 142 extending across upper housing 116. The open end of housing 116 is then rolled over sleeve 120 to secure sleeve 120 within upper housing 116 as shown in FIG. 4. Notches 136 in conjunction with the rolled edge of upper housing 116 thus form a plurality of circumferentially spaced closed recesses within the assembly of gas spring 112 and sleeve 120 which will allow for the assembly of the remainder of actuator 110 as will be described later herein.

Pin retainer 122 is a generally cylindrical member having a plurality of radially projecting axially extending flanges 144 extending from a hollow main cylindrical body 146. The outside diameter formed by the plurality of flanges 144 is sized slightly smaller than the internal diameter of main body 134 of die cast sleeve 120. A plurality of circumferentially spaced retaining tabs 148 also extend radially outward from cylindrical body 146. Each tab 148 has a partially cylindrical section 150 extending generally parallel to main body 146 and a retaining section 154 extending angularly from partial cylindrical section 152. Retaining section 154 extends outward such that the diameter of the circle formed by the plurality of circumferentially spaced retaining tabs 148 is greater than the internal diameter of main body 134 of die cast sleeve 120.

An annular plate 156 is located on the end of main cylindrical body 146 adjacent to the plurality of tabs 148. A centrally located aperture 158 extends through annular plate 156 to allow for actuating pin 124 to extend through pin retainer 122. Annular plate 156 also has a plurality of circumferentially spaced notches 160 located on its exterior surface and extending radially inward which facilitate the assembly of rotating cam 26 and cam housing 28 to pin retainer 122 as will be described later herein.

Actuating pin 124 is a ribbed pin which has a button section 162 located at one end and an anvil 164 located at its opposite end. Actuating pin 124 is located within pin retainer 122 with button section 162 extending through aperture 158. Aperture 158 is configured to correspond with the shape of actuating pin 124 and to slidingly receive actuating pin 124. The combination of pin retainer 122 and actuating pin 124 is then located within sleeve 120 and upper housing 116. Pin retainer 122 is inserted into the inside diameter of sleeve 120 and as pin retainer 122 is inserted, the plurality of circumferentially spaced retaining tabs 148 will deflect radially inward until tabs 148 pass the rolled edge of outer housing 116. Once tabs 148 pass the rolled edge of outer housing 116, they will spring back and extend into the plurality of circumferentially spaced notches 136 to retain pin retainer 122 within sleeve 120.

Cam housing 26 is a cup shaped housing having a plurality of circumferentially spaced locking tabs 60 which correspond with the plurality of circumferentially spaced notches 160 located on the exterior surface of annular plate 156 of pin retainer 122. A mounting jacket 62 extends from cam housing 26 to provide for the attachment of cable control assembly 30 as well as access for cable control assembly 30 to mate with rotating cam 28. The internal surface of cam housing 26 is provided with a pair of angular camming surfaces 64 and a cylindrical guide member 66 for mating with rotating cam 28 as will be described later herein. Cam housing 26 is assembled to pin retainer 122 by aligning the plurality of circumferentially spaced locking tabs 60 with the plurality of circumferentially spaced notches 160 and extending the plurality of locking tabs 60 through the plurality of notches 160 until a locking flange 68 located on each of the plurality of locking tabs 60 snaps into a position below annular plate 156 as shown in FIG. 4. The plurality of locking tabs 60 are designed to deflect outwardly as cam housing 26 is assembled to annular plate 156. The plurality of locking tabs 60 snap back into their original position once the plurality of locking flanges 68 clear the width of annular plate 156. In this position, cam housing 26 is locked to pin retainer 122. By providing a plurality of circumferentially spaced tabs 60 and corresponding notches 160, it makes it possible to locate mounting jacket 62 at various location circumferentially with respect to pin retainer 122. Thus jacket 62 may be positioned in the most convenient circumferential location for each individual application.

Disposed between cam housing 26 and actuating pin 124 is rotating cam 28. Rotating cam 28 has a pair of annular camming surfaces 70 which is adapted to mate with the pair of annular camming surfaces 64 of cam housing 26. In its normal position as shown in FIG. 4, camming surfaces 70 are mated with camming surfaces 64 and rotating cam 28 is in contact with both actuating pin 124 and cam housing 26. In this position, actuating pin 124 is resting against rotating cam 28 and valve stem 118 with valve stem 118 in the upward position with the internal valve of gas spring 112 closed. When rotating cam 28 is rotated relative to cam housing 26, rotating cam 28 is forced downward within cam housing 26 due to the interaction of camming surfaces 70 rotating with respect to camming surfaces 64. This downward movement of rotating cam 28 forces actuating pin 124 downward which in turn forces valve stem 118 downward to open the internal valve of gas spring 112 and allow for the adjustment of the length of gas spring 112. Once the desired position of gas spring 112 is achieved, rotating cam 28 is rotated back to its original position after the release of the actuator connected to cable control assembly 30, as shown in FIG. 4, to release valve stem 118 and lock gas spring 112 in its position by closing the internal valve. The movement of rotating cam 28 within cam housing 26 is guided by a cylindrical projection 72 which is slidingly received within cylindrical guide member 66 provided on cam housing 26.

The rotating of rotating cam 28 is accomplished by cable control assembly 30. Cable control assembly 30 comprises an outer conduit 80 and an internal cable 82 which is longitudinally movable within outer conduit 80. Both outer conduit 80 and internal cable 82 are flexible to allow for the routing of cable control assembly 30 to any specified location on the piece of furniture. As shown in FIGS. 4 and 5, outer conduit 80 is fixedly secured to mounting jacket 62 by means known well in the art. Internal cable 82 extends through outer conduit 80 and through mounting jacket 62 of cam housing 26 and partially wraps around rotating cam 28. The end of internal cable 82 is fixedly secured to rotating cam 28 by methods known well in the art. The opposite end of control cable assembly is attached to any type of the various standard or custom cable control actuators also known well in the art.

When internal cable 82 is pulled longitudinally through outer conduit 80, rotating cam 28 is rotated relative to cam housing 26 and valve stem 118 opens the internal valve as described above. When the control actuator is released, rotating cam 28 is returned to its original position due to a biasing force being applied to valve stem 118 and/or a biasing load being applied to the control actuator.

The embodiments of the present invention thus provides a compact rotary actuator mechanism for releasing the valve in a locking gas spring. The mechanism is assembled directly to the gas spring to minimize the amount of space required for the mechanism as well as simplifying the assembly of the mechanism within the piece of furniture. The use of a flexible cable control assembly allows for the positioning of the cable control actuator in a position on the furniture piece which is most convenient for the intended user.

While the above detailed description describes the preferred embodiment of the present invention, it should be understood that the present invention is susceptible to modification, variation and alteration without deviating from the scope and fair meaning of the subjoined claims.

What is claimed is:

1. A combination of an operator and a gas spring, said gas spring defining a longitudinal axis, said operator comprising:
   a housing fixedly secured to said gas spring;
   an actuating pin disposed within said housing, said actuating pin being movable generally parallel to said longitudinal axis of said gas spring to actuate said gas spring;
   a drive mechanism disposed within said housing and secured for rotation about said longitudinal axis of said gas spring, said rotation of said drive mechanism moving said pin within said housing to effect the actuation of said gas spring; and
   a cable assembly fixedly secured to said drive mechanism for rotating said drive mechanism within said housing.

2. The operator according to claim 1 wherein said housing comprises:
   a pin retainer fixedly secured to said gas spring; and
   a cam housing fixedly secured to said pin retainer.

3. The operator according to claim 2 wherein said cam housing includes a first cam surface which engages said drive mechanism to cause said pin to move within said housing.

4. The operator according to claim 3 wherein said drive mechanism includes a second cam surface which engages with said first cam surface to cause said pin to move within said housing.

5. The operator according to claim 1 wherein said housing comprises:
   a sleeve fixedly secured to said gas spring;
   a pin retainer disposed within said sleeve; and
   a cam housing secured to said pin retainer.

6. The operator according to claim 5 wherein said cam housing includes a first cam surface which engages said drive mechanism to cause said pin to move within said housing.

7. The operator according to claim 6 wherein said drive mechanism includes a second cam surface which engages said first cam surface to cause said pin to move within said housing.

8. The operator according to claim 5 wherein said drive mechanism includes a cam surface which engages said housing to cause said pin to move within said housing.

9. The operator according to claim 1 wherein said drive mechanism includes a cam surface which engages said housing to cause said pin to move within said housing.

10. The operator according to claim 1 wherein said cable assembly comprises:
    an outer fixed cable fixedly secured to said housing; and
    an inner cable disposed within said outer cable, said inner cable movable within said outer cable and fixedly secured to said drive mechanism.

11. A combination of an operator and a gas spring, said gas spring defining a longitudinal axis, said operator comprising:
    a pin retainer fixedly secured to said gas spring;
    a cam housing fixedly secured to said pin retainer;
    an actuating pin disposed within said pin retainer, said actuating pin being movable generally parallel to said longitudinal axis of said gas spring to actuate said gas spring;
    a rotating cam disposed within said cam housing and secured for rotation about said longitudinal axis of said gas spring, said rotating cam moving said pin within said housing to effect the actuation of said gas spring; and
    a cable assembly fixedly secured to said rotating cam for rotating said cam within said cam housing.

12. The operator according to claim 11 wherein said cam housing includes a first cam surface which engages said rotating cam to cause said pin to move within said pin retainer.

13. The operator according to claim 12 wherein said rotating cam includes a second cam surface which engages said first cam surface to cause said pin to move within said pin retainer.

14. The operator according to claim 11 wherein said rotating cam includes a cam surface which engages said cam housing to cause said pin to move within said pin retainer.

15. The operator according to claim 11 wherein said cable assembly comprises:
    an outer fixed cable fixedly secured to said housing; and
    an inner cable disposed within said outer cable, said inner cable movable within said outer cable and fixedly secured to said drive mechanism.

16. A combination of an operator and a gas spring, said gas spring defining a longitudinal axis, said operator comprising:
    a sleeve fixedly secured to said gas spring;
    a pin retainer disposed within said sleeve;
    a cam housing fixedly secured to said pin retainer;
    an actuating pin disposed within said pin retainer, said actuating pin being movable generally parallel to said longitudinal axis of said gas spring to actuate said gas spring;
    a rotating cam disposed within said cam housing and secured for rotation about said longitudinal axis of said gas spring, said rotation of said rotating cam moving said pin within said housing to effect the actuation of said gas spring; and
    a cable assembly fixedly secured to said rotating cam for rotating said cam within said cam housing.

17. The operator according to claim 16 wherein said cam housing includes a first cam surface which engages said rotating cam to cause said pin to move within said pin retainer.

18. The operator according to claim 17 wherein said rotating cam includes a second cam surface which engages said first cam surface to cause said pin to move within said pin retainer.

19. The operator according to claim 16 wherein said rotating cam includes a cam surface which engages with said cam housing to cause said pin to move within said pin retainer.

20. The operator according to claim 16 wherein said cable assembly comprises:
    an outer fixed cable fixedly secured to said housing; and
    an inner cable disposed within said outer cable, said inner cable movable within said outer cable and fixedly secured to said drive mechanism.

* * * * *